S. G. SMITH.
DISH WASHING MACHINE.
APPLICATION FILED JAN. 2, 1919.

1,345,412.

Patented July 6, 1920.
2 SHEETS—SHEET 1.

INVENTOR
Stephen G. Smith,
BY
H. MacKay
ATTORNEY

S. G. SMITH.
DISH WASHING MACHINE.
APPLICATION FILED JAN. 2, 1919.
1,345,412.
Patented July 6, 1920.
2 SHEETS—SHEET 2.
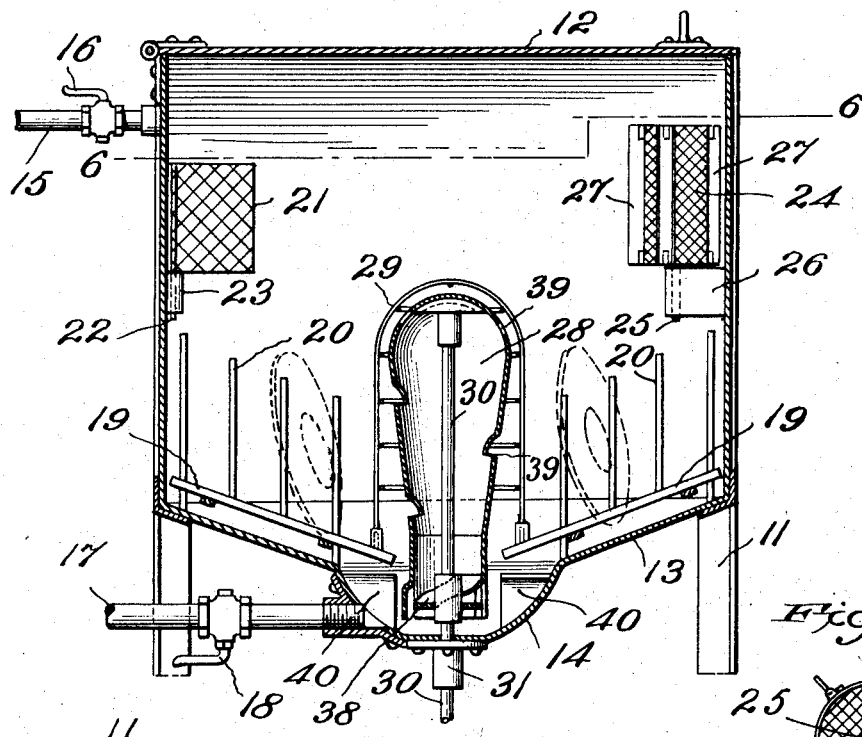
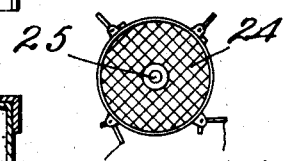
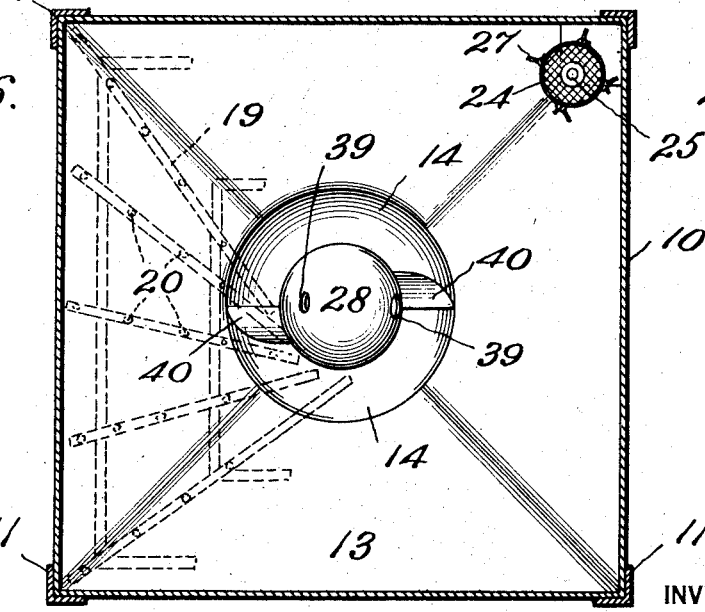
INVENTOR
Stephen G. Smith,
BY
ATTORNEY

UNITED STATES PATENT OFFICE.

STEPHEN G. SMITH, OF BROOKLYN, NEW YORK.

DISH-WASHING MACHINE.

1,345,412.  Specification of Letters Patent.  Patented July 6, 1920.

Application filed January 2, 1919. Serial No. 269,314.

*To all whom it may concern:*

Be it known that I, STEPHEN G. SMITH, a citizen of the United States, residing at Brooklyn, in the county of Kings and State of New York, have invented certain new and useful Improvements in Dish-Washing Machines; and I do hereby declare the following to be a full, clear, and exact description of the invention, such as will enable others skilled in the art to which it appertains to make and use the same.

My present invention relates to an improved apparatus for rapidly and efficiently washing dishes, silverware, pots and pans and the like; and indeed my washing machine will be found successful for cleansing a great variety of other articles.

The principal object of the invention is the provision of a novel and improved form of distributer for the water, suds or other cleansing fluid; whereby such fluid is rapidly circulated and is applied to the articles to be washed in jets which are powerfully projected and change their direction constantly so as to reach with certainty and efficiency all parts of the articles placed in the container provided for them.

My invention includes certain other features of novelty, the nature and advantages of which are set forth hereinafter.

Figure 1:
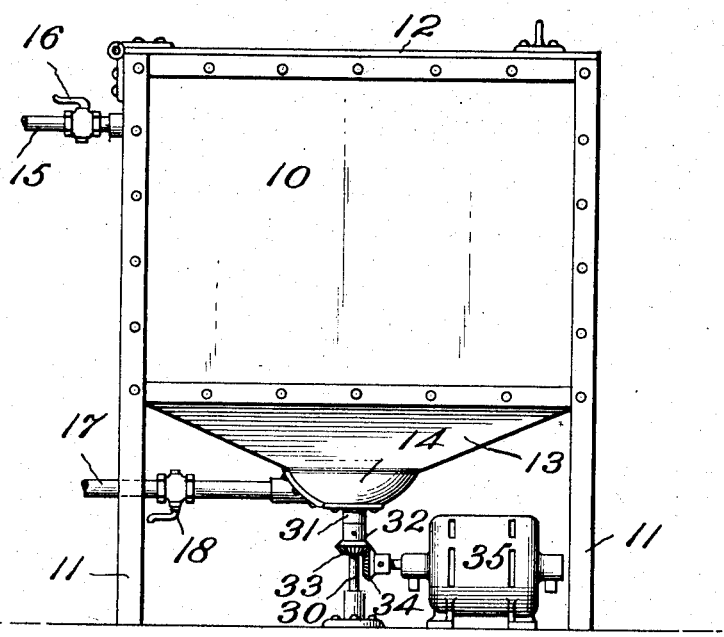
Figure 2:
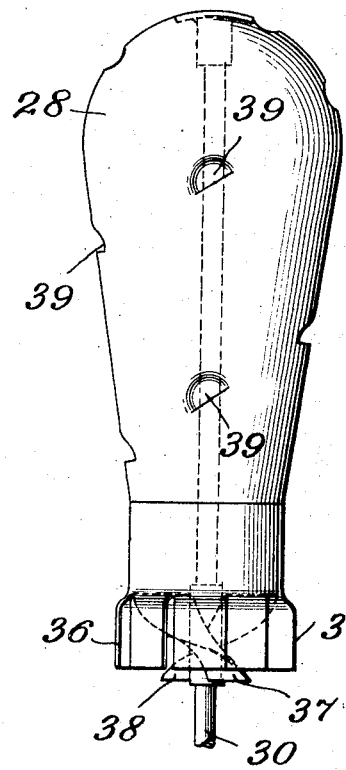
Figure 3:
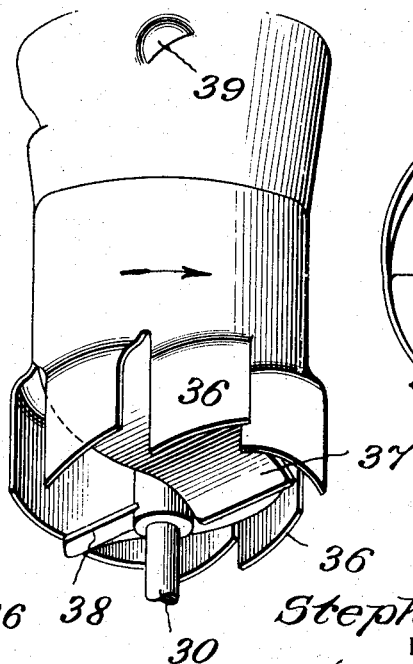
Figure 4:
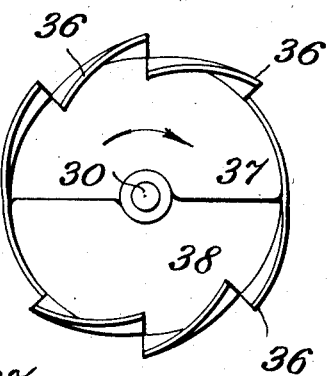

I have illustrated a preferred form of the apparatus in question in the accompanying drawings, wherein Figure 1 is a side elevation of my dish washer, Fig. 2 is a side elevation of the distributer, Fig. 3 is a perspective view of the lower part of the distributer, Fig. 4 is a bottom plan view of a slightly modified form, Fig. 5 is a median vertical sectional view of the entire device, Fig. 6 is a horizontal sectional view of the same taken on the line 6—6 of Fig. 5 with certain parts removed, and Fig. 7 is a plan view of a form of silverware basket as preferably used in my device.

The articles to be washed are placed in a container 10, which may have any desired general shape, and in the specific form shown is supported by legs 11. A hinged cover 12 gives access to the top to permit of inserting the articles to be washed.

The bottom 13 of the container slopes downward from all sides toward a well 14 from which the cleaning fluid is distributed as hereinafter described. This cleaning fluid, whether hot or cold, or whether for washing or rinsing is preferably introduced through a pipe 15 and is controlled by the valve 16. Where hot water is used, a suds can be made by introducing the necessary soap in powdered or other form through the cover. The rapid circulation and agitation of the water incident to use will soon form the suds. For cleaning and draining purposes, I provide a pipe 17 and valve 18 at the bottom.

The dishes, pans or other articles are supported in appropriate positions around the central distributer by any suitable means, and I have shown for this purpose the radiating racks 19, supported above the sloping bottom of the device so as not to impede free return flow of fluid to the well 14. These racks have vertical pegs 20, which serve to support the articles to be washed. This is indicated in Fig. 5 by two plates shown in dotted lines. In Fig. 5 I have shown a stationary wire rack 21 for small articles which may extend along the entire length of the wall, and is made removable by supporting it on pins 22 entering sockets 23. This may be used for holding miscellaneous articles. I have also shown the revolving wire rack 24 for knives, forks, etc., mounted in one corner to turn on a central fixed pin 25, carried by a bracket 26. This rack or basket is provided with a number of blades 27, so mounted (on the one hand) as to swing down against the basket. These blades cause the basket to revolve in the manner hereinafter described.

The principal active element of my dish washer comprises the revolving distributer 28, preferably surrounded by a wire guard 29 to prevent the articles to be washed from touching it. This distributer is composed of a hollow shell, preferably of sheet metal, elongated vertically and preferably rounded at the top. I also prefer to make this shell widen gradually upward from the neck or inlet at the bottom, for reasons stated hereinafter. This is not, however, essential to the invention. The shell 28 is supported upon a central vertical spindle 30, projecting down through a suitable water-tight bearing 31 in the bottom of the well 14, as shown. Other arrangements of this spindle are within my invention which covers broadly any construction which admits of revolving the distributer.

A sleeve 32, fixed on the spindle 30, carries a miter gear 33, driven by a similar gear 34 on the shaft of a driving motor 35, preferably driven electrically. By these means the distributer can be given a high rate of revolution. In practice I have secured excellent results at a speed of 1700 revolutions per minute.

The neck of the distributer extends nearly to the bottom of the well 14, and, as shown best in Figs. 2, 3 and 4, this neck is severed vertically and its various parts are bent outward to form curved scoops 36 so directed that, when the distributer is revolved in the direction of the arrow in Fig. 3, these scoops act to draw the water in the well swiftly toward the interior of the neck of the distributer.

As shown in Fig. 4, the scoops need not be of uniform size and distribution. In this figure the two scoops at the right and left of the figure are each twice as long, measured circumferentially, as the remaining scoops.

Surrounded by these scoops, so as to receive the water thrown inward by them are two sloping and spirally placed blades 37 and 38, whose inclination is such as to throw the water violently upward and outward along the interior surface of the distributer and all the way to its top.

I have found in practice that the combined action of the scoops 36 and lifting blades 37 and 38 is to project upward a continual solid stream of water whose centrifugal tendency holds it toward the inner surface of the shell all around the same. The preferred flaring shape of the shell, by providing a wider channel as the water progresses upward, produces a certain suction which I have found to greatly accelerate the movement of the water, thereby increasing the efficiency of operation in a marked degree.

The water thus lifted and caused to revolve finds its way out of the distributer through openings 39 in the shell preferably formed by slitting and bending the metal as shown. These openings may be located in vertical rows or otherwise and may have such sizes and be provided in such number as judgment may direct. I prefer to incline the slits as shown in Figs. 2 and 3 so as to bring the maximum dimension of each in the most efficient position with respect to the direction of the water with relation to the shell. It will be understood, of course, in this connection that, while the water is whirling in the direction of the arrow in Fig. 3, the shell is revolving in the same direction at a considerably higher speed.

In order to prevent a swirling motion being set up in the well 14 around the neck of the distributer I find it best to use baffle plates 40 within the well. These plates are preferably curved inward and downward as shown in Figs. 5 and 6, so that, as the water is started to swirl in the well by contact with the neck of the distributer, it is led directly toward the lower part of said neck and within the immediate influence of the scoops 36.

When the distributer above described is set in motion, after providing cleaning fluid enough to fill the well 14, there is projected outward from each opening 39 a swift jet of cleaning fluid; and, it will be seen that these jets are continually changing direction as the distributer revolves. This virtually fills the entire container with a volume of violently radiating fluid which has an efficient scouring and detergent action upon the dishes or other articles placed in its path within the container 10. Moreover, a portion of the fluid, after striking the walls of the container is reflected back upon the articles to be washed, so that these are thus cleansed all around.

The water of course returns by gravity to the well 14, and is again projected as above described, and a circulation of cleansing fluid is kept up as long as desired. The pipes 15 and 17 can be used to change the fluid as often as desired.

One effect of the centrifugally moving water will be to set up automatic revolution of the rack or basket 24, since, the paddles or blades 27 will resist the impact of that part of the water tending to swing them open when in their radial position, while the paddles placed diametrically with respect to those just mentioned will swing down against the basket and have no effect.

Various changes may be made in the apparatus set forth without departing from the scope of my invention, and I do not limit myself to the details herein shown and described.

What I claim is:—

1. A washing machine comprising in combination a container, a central revoluble distributer within the same, and means surrounding the distributer, for supporting the articles to be washed; said distributer comprising a single upright hollow perforated shell having an open neck at the bottom of smaller diameter than said shell and provided with blades within said neck adapted when revolved to project water upward against the inner wall of said shell, whereby the water may be ejected by centrifugal action.

2. The structure set forth in claim 1 hereof, wherein the periphery of the neck of the distributer is provided with auxiliary scooping blades adapted when revolved to draw water inward toward the center of the neck.

3. The structure set forth in claim 1 hereof, wherein the distributer is composed of a hollow shell expanded gradually from the neck upward.

4. The structure set forth in claim 1 hereof wherein a central well is provided in the bottom of the container within which is located the neck of the distributer, and wherein are placed, within said well and around said neck, baffle plates which are curved downward and inward so as to be convex in the direction of rotation of the distributer.

5. A washing machine comprising a container, a central means adapted to project streams of water outward, a revoluble basket in the path of such streams within the container and swinging paddles on said basket adapted to swing either in against the same or into an open and substantially radial position.

In testimony whereof I affix my signature.

STEPHEN G. SMITH.